United States Patent
Agrawal et al.

(10) Patent No.: US 12,552,032 B2
(45) Date of Patent: Feb. 17, 2026

(54) AUGMENTED REALITY-BASED TASK MANAGEMENT

(71) Applicant: International Business Machines Corporation, Armonk, NY (US)

(72) Inventors: Tushar Agrawal, West Fargo, ND (US); Atul Mene, Morrisville, NC (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 17/807,753

(22) Filed: Jun. 20, 2022

(65) Prior Publication Data

US 2023/0405821 A1    Dec. 21, 2023

(51) Int. Cl.
*G05D 1/648*    (2024.01)
*B25J 9/16*     (2006.01)
*G06T 19/00*    (2011.01)

(52) U.S. Cl.
CPC ........... *B25J 9/1674* (2013.01); *B25J 9/1664* (2013.01); *B25J 9/1697* (2013.01); *G06T 19/006* (2013.01)

(58) Field of Classification Search
CPC ...... B25J 9/1674; B25J 9/1664; B25J 9/1697; B25J 9/1661; B25J 9/0084; B25J 9/1676; G06T 19/006; G05B 2219/39449; G05B 2219/40202; G05B 19/41885; G05B 2219/50391; G05B 19/00; G05B 19/41865

(Continued)

(56) References Cited

U.S. PATENT DOCUMENTS 8,510,952 B2    8/2013  Amirehteshami
9,050,723 B1 *  6/2015  Elazary .................... B25J 9/163

(Continued)

FOREIGN PATENT DOCUMENTS

CN    103268091 B    4/2015
CN    106078208 B    10/2019
KR    101471852 B1   12/2014

OTHER PUBLICATIONS

"Collaborative Assembly with Vision-Based Safety System", Trinity Robotics, Accessed Apr. 16, 2022, 3 pages, <https://trinityrobotics.eu/use-cases/collaborative-assembly-with-vision-based-safety-system/>.

(Continued)

*Primary Examiner* — Dalena Tran
(74) *Attorney, Agent, or Firm* — Joseph P. Curcuru (57) ABSTRACT

In an approach to improve the management and execution of a task, embodiments receive, by a computing device, the task, divide the task into a plurality of steps, and assign the plurality of steps to an end user and a robotic system. Further, embodiments identify a sequence of predetermined or anticipated motions that will be performed by the robotic system to carry out the plurality of steps, and output a virtual display, by an augmented reality device associated with the end user, the identified predetermined or anticipated motions of the robotic system. Additionally, embodiments communicate guidance, based on the virtual display, to the augmented reality device associated with the end user to guide the end user, and dynamically adjust the guidance based on an identified performance of the end users or the robotic system.

20 Claims, 5 Drawing Sheets

(58) Field of Classification Search
USPC .......................................................... 700/245
See application file for complete search history.

(56) References Cited

U.S. PATENT DOCUMENTS

| | | | |
|---|---|---|---|
| 9,393,691 | B2 | 7/2016 | Noda |
| 10,089,586 | B2 | 10/2018 | Vestal |
| 2021/0237278 | A1 | 8/2021 | Huber |
| 2021/0252699 | A1* | 8/2021 | Ramani .................. B25J 9/1605 |
| 2022/0040844 | A1* | 2/2022 | Tsurumi .................. B25J 9/163 |
| 2022/0100263 | A1 | 3/2022 | Nagar |

OTHER PUBLICATIONS

"Wearable AR-based Interaction Interface for HRC", Trinity Robotics, Accessed Apr. 16, 2022, 3 pages, <https://trinityrobotics.eu/modules/wearable-ar-based-interaction-iknterface-for-hrc/?post=1293>.

Disclosed Anonymously, "System for Managing a Manufacturing Environment", An IP.com Prior Art Database Technical Disclosure, IP.com No. IPCOM000136244D, IP.com Electronic Publication Date: May 10, 2006, 28 pages, <https://priorart.ip.com/IPCOM/000136244>.

Hietanen, et al., "AR-based interaction for human-robot collaborative manufacturing", Robotics and Computer-Integrated Manufacturing, vol. 63, Article 101891, Jun. 2020, 9 pages, <https://www.researchgate.net/publication/341794660_AR-based_interaction_for_human-robot_collaborative_manufacturing>.

Hietanen, et al., "Proof of concept of a projection-based safety system for human-robot collaborative engine assembly", 28th IEEE International Conference on Robot and Human Interactive Communication (RO-MAN), 2019, 7 pages, <https://ieeexplore.ieee.org/document/8956446>.

Kast, et al., "Augmenting working areas with action-relevant information for intuitive human-robot cooperation", i-CREATe 2018: Proceedings of the 12th International Convention on Rehabilitation Engineering and Assistive Technology, Jul. 2018 , pp. 313-316, <https://dl.acm.org/doi/abs/10.5555/3281667.3281733>.

Liu, et al, "Dynamic risk assessment and active response strategy for industrial human-robot collaboration", Computers & Industrial Engineering, vol. 141, Article 106302, Mar. 2020, 15 pages, <https://www.sciencedirect.com/science/article/pii/S036083522030036X>.

Mourtzis, et al., "Closed-Loop Robotic Arm Manipulation Based on Mixed Reality", Applied Sciences, vol. 12, Issue 6, Article 2972, Mar. 14, 2022, 17 pages, <https://www.mdpi.com/2076-3417/12/6/2972>.

IBM, "Manufacturing technology solutions", May 13, 2025, 12 pages, https://www.ibm.com/industries/manufacturing.

IBM, "What is Industry 4.0?", May 13, 2025, 11 pages, https://www.ibm.com/think/topics/industry-4-0.

Melissa Rika, "Global Mobile Robot Market Will Reach USD 8.8 Billion by 2033", Statzone, Apr. 18, 2024, 14 pages, https://statzon.com/insights/global-mobile-robot-market.

* cited by examiner

FIG. 4 ized sensory information can be constructive (i.e., additive to the natural environment), or destructive (i.e., masking of the natural environment). This experience is seamlessly interwoven with the physical world such that it is perceived as an immersive aspect of the real environment. In this way, augmented reality alters one's ongoing perception of a real-world environment, whereas virtual reality completely replaces the user's real-world environment with a simulated one. Augmented reality is related to two largely synonymous terms: mixed reality and computer-mediated reality.
AUGMENTED REALITY-BASED TASK MANAGEMENT

BACKGROUND OF THE INVENTION

The present invention relates generally to the field of augmented reality, and more particularly to utilizing augmented reality to coordinate task management and collaboration with a robotic system.

Various robotic systems provide intelligent workflows that integrate data from equipment gathered through a payload on a mobile robot (sensors, cameras, microphones, processors, software, edge cloud, and/or fifth generation technology standard for broadband cellular networks (5G)) to back-end support systems for monitoring, asset management, supply chain, and safety. Development of offerings, assets, use cases and partnerships may be centralized under an intelligent connected operations practice. Manufacturers are integrating new technologies, including Internet of Things (IoT), cloud computing and analytics, and AI and machine learning into their production facilities and throughout their operations. These smart factories are equipped with advanced sensors, embedded software and robotics that collect and analyze data and allow for better decision making.

Augmented reality (AR) is an interactive experience of a real-world environment where the objects that reside in the real world are enhanced by computer-generated perceptual information, sometimes across multiple sensory modalities, including visual, auditory, haptic, somatosensory, and olfactory. AR can be defined as a system that incorporates three basic features: a combination of real and virtual worlds, real-time interaction, and accurate three-dimensional (3D) registration of virtual and real objects. The overlaid sensory information can be constructive (i.e., additive to the natural environment), or destructive (i.e., masking of the natural environment). This experience is seamlessly interwoven with the physical world such that it is perceived as an immersive aspect of the real environment. In this way, augmented reality alters one's ongoing perception of a real-world environment, whereas virtual reality completely replaces the user's real-world environment with a simulated one. Augmented reality is related to two largely synonymous terms: mixed reality and computer-mediated reality.

SUMMARY

Embodiments of the present invention disclose a computer-implemented method, a computer program product, and a system for coordinating performance of a task, the computer-implemented method comprising: receiving, by a computing device, the task; dividing, by the computing device, the task into a plurality of steps; assigning the plurality of steps to one or more end users and one or more robotic systems; identifying a sequence of predetermined or anticipated motions that will be performed by the one or more robotic systems to carry out the plurality of steps; outputting a virtual display, by an augmented reality device associated with the one or more end users, the identified predetermined or anticipated motions of the one or more robotic systems; communicating guidance, based on the virtual display, to the augmented reality device associated with the one or more end users to guide the one or more end users; and dynamically adjusting the guidance based on an identified performance of the one or more end users or the one or more robotic systems.

DETAILED DESCRIPTION

In various industries end users and robotic systems are collaborating with each other to perform various types of activities. Embodiments of the present invention recognize that end users and robotic systems will continuously communicate in order to effectively perform a task, wherein the end user and the robotic system perform tasks without creating obstacles for one another. Embodiments of the present invention recognize that while robotic systems (e.g., robotic workers) and end users (e.g., robotic operators, robotic engineers, factory workers, etc.) collaborate with each other while performing predetermined and/or dynamic activities, end users are unable to visualize a predetermined number of robotic system movement steps, so that end users can identify how to move to perform the collaborative task. The term task can be, but is not limited to, a movement, an activity, an action, a work assignment, and/or digital command. The terms task and activity can be interchangeable, herein.

Embodiments improve the art and solve at least the issue(s) stated above by analyzing the context and other external factors of an environment and task/activity, wherein based on the analyzed context and other external factors assigning one or more steps within an assigned task to an end user or a robotic system to collaborate on. If the robotic system is working on a task, then embodiments visually display a next set of predetermined or predicted activities (e.g., movements and/or actions) to be performed by the robotic system to the end user, via augmented reality (AR) or virtual reality (VR). Embodiments may guide or provide instructions to the end user to participate and collaborate on the subsequent predetermined or predicted steps where an end user's involvement may be required.

Further, embodiments of the present invention improve the art and solve at least the issue(s) stated above by (i) identifying a task to be performed; (ii) breaking down the task into a plurality of steps; (iii) assigning one or more of the plurality of steps to one or more end users and one or more of the plurality of steps to one or more robotic workers based on one or more skills of the one or more end users, one or more capabilities of the one or more robotic workers, and one or more environmental factors of an environment; (iv) identifying a sequence of end user motions required for the one or more end users to perform in carrying out one or more of the plurality of steps; (v) identifying a sequence of robotic motions required for the one or more robotic workers to perform in carrying out one or more of the plurality of steps; (vi) visualizing, using an augmented reality device worn by the one or more end users, one or more motions comprising the sequence of robotic motions to an end user; and (vii) visualizing, using the augmented reality device, one or more motions comprising the sequence of an end user motions associated with completing a task/activity. Thus, embodiments, improve the art by at least reducing accidents, increasing collaborative effectiveness, and improving productivity as detailed both above and below.

It should be noted herein that in the described embodiments, participating parties have consented to being recorded and monitored, and participating parties are aware of the potential that such recording and monitoring may be taking place. In various embodiments, for example, when downloading or operating an embodiment of the present invention, the embodiment of the invention presents a terms and conditions prompt enabling the user to opt-in or opt-out of participation. Similarly, in various embodiments, emails and texts begin with a written notification that the user's information may be recorded or monitored and may be saved, for the purpose of generating, managing, and/or distributing personalized metadata. These embodiments may also include periodic reminders of such recording and monitoring throughout the course of any such use. Certain embodiments may also include regular (e.g., daily, weekly, monthly) reminders to the participating parties that they have consented to being recorded and monitored for generating, managing, and/or distributing personalized metadata, and may provide the participating parties with the opportunity to opt-out of such recording and monitoring if desired. Furthermore, to the extent that any non-participating parties' actions are monitored (for example, when outside vehicles are viewed), such monitoring takes place for the limited purpose of providing navigation assistance to a participating party, with protections in place to prevent the unauthorized use or disclosure of any data for which an individual might have a certain expectation of privacy.

Implementation of embodiments of the invention may take a variety of forms, and exemplary implementation details are discussed subsequently with reference to the Figures (i.e., FIG. 1A-FIG. 4).

Figure 1A:
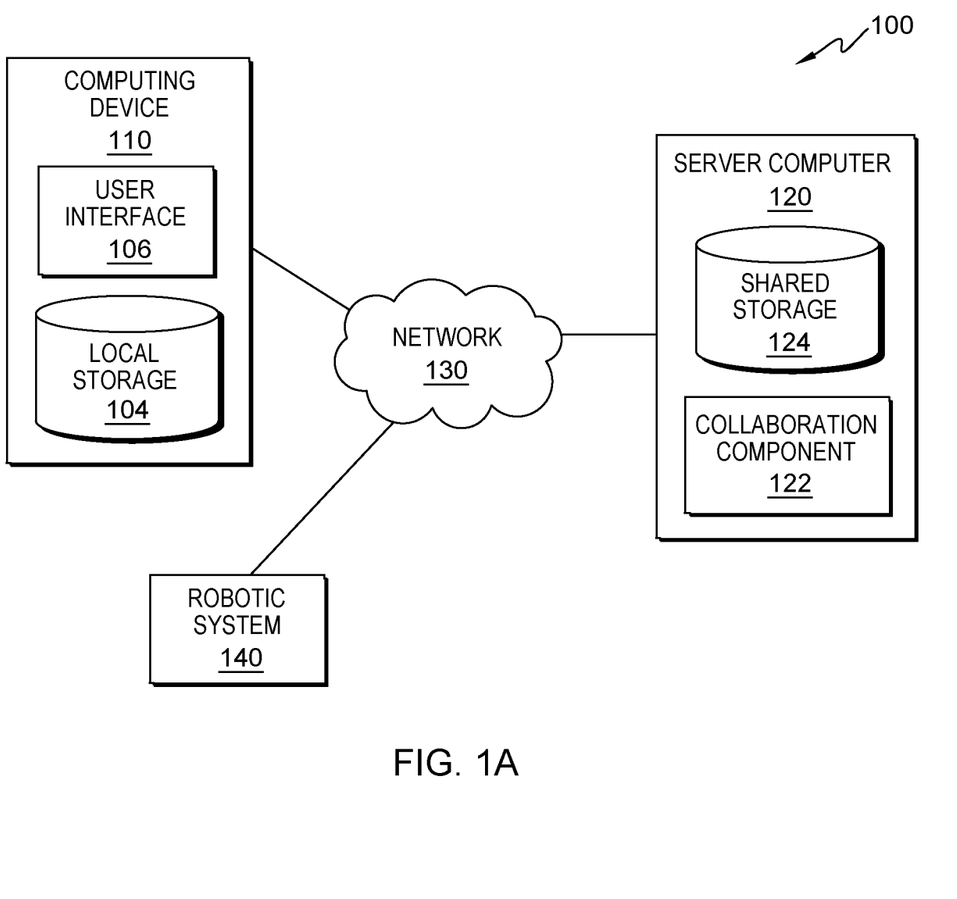
FIG. 1A is a functional block diagram illustrating a distributed data processing environment, in accordance with an embodiment of the present invention.

FIG. 1A is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1A provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110, robotic system 140, and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer 120, and any other computing devices and/or storage devices (not shown in FIG. 1A) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses or AR device, a virtual reality headset, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 1A, computing device 110 may have a plurality of interfaces 106. In other embodiments, not depicted in FIG. 1A, distributed data processing environment 100 may comprise a plurality of computing devices, plurality of server computers, and/or one a plurality of networks. Computing device 110 may include internal and external hardware components, as depicted, and described in further detail with respect to FIG. 4.

User interface (interface) 106 provides an interface to automatic traffic analysis (ATA) component (component) 122. Computing device 110, via user interface 106, may enable a user and/or a client to interact with component 122 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. Interface 106 may act as an AR display and interface. Interface 106 may include data (such as graphic, text, and sound) presented to a user and control sequences the user employs to control operations. In another embodiment, interface 106 may be a mobile application software providing an interface between a user of computing device 110 and server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer 120 may be a standalone computing device, a management server, a web server, a mobile computing device, one or more client servers, or any other electronic device or computing system capable of receiving, sending, and processing data. In other embodiments, server computer 120 may represent a server computing system utilizing multiple computers such as, but not limited to, a server system, such as in a cloud computing environment. In another embodiment, server computer 120 may represent a computing system utilizing clustered computers and components (e.g., database server computers, application server computers, etc.) that act as a single pool of seamless resources when accessed within distributed data processing environment 100. Server computer 120 may include internal and external hardware components, as depicted, and described in further detail with respect to FIG. 4. In some embodiments server computer 120 may represent a plurality of server computers.

Robotic system 140 may be an integrated system of one or more computer-controlled manipulators and mechanical arms that operates autonomously or is operated remotely (e.g., teleoperated) by an end user, including attachable components or assemblies that operate as part of (and not separately from) such a system during any task. Robotic system 140 may perform tasks associated with, but not limited to, medical or surgical diagnosis, treatment, or procedure, agriculture, food preparation, manufacturing, and/or other various industry and healthcare related tasks.

Each of shared storage 124 and local storage 104 may be a data/knowledge repository and/or a database that may be written and/or read by one or a combination of component 122, server computer 120 and computing device 110. In some embodiments, each of shared storage 124 and local storage 104 may be a data/knowledge repository, a knowledge base, a knowledge center, a knowledge corpus, and/or a database that may be written and/or read by one or a combination of component 122, server computer 120 and computing device 110. In the depicted embodiment, shared storage 124 resides on server computer 120 and local storage 104 resides on computing device 110. In another embodiment, shared storage 124 and/or local storage 104 may reside elsewhere within distributed data processing environment 100, provided that each may access and is accessible by computing device 110 and server computer 120. Shared storage 124 and/or local storage 104 may each be implemented with any type of storage device capable of storing data and configuration files that may be accessed and utilized by server computer 120, such as, but not limited to, a database server, a hard disk drive, or a flash memory. In various embodiments, not depicted in FIG. 1A, in addition to shared storage 124, server computer comprises a primary and a secondary database, described below in FIG. 4. The primary database, also referred to as primary storage device, may be one or more of any type of disk storage known in the art. The secondary database, also referred to as secondary storage device, may be one or more any type of tape storage known in the art.

In the depicted embodiment, component 122 is executed on server computer 120. In other embodiments, component 122 may be executed on computing device 110. In various embodiments of the present invention, not depicted in FIG. 1A, component 122 may execute on a plurality of server computers 120 and/or on a plurality of computing devices 110. In some embodiments, component 122 may be located and/or executed anywhere within distributed data processing environment 100 as long as component 122 is connected to and/or communicates with, computing device 110, and/or server computer 120, via network 130.

Component 122 may conduct an environmental ecosystem context review and scope baseline by analyzing the contextual scenario, external influencing factors, and accordingly based on the assigned task, component 122 may assign one or more task steps to an end user and/or robotic system. For example, assembling a predetermined system is to be performed by a robotic system but the assembly requires both an end user and robotic system to participate, so component 122 retrieves, from shared storage 124, (i) the required tasks and movement associated with the required tasks from historical data, (ii) previously assigned tasks to both the end user and robotic system, and (iii) identifies how the sequence of movements associated with the required tasks, and displays the in a workflow the sequence of movements associated with the required tasks to the end user to efficiently complete the task with the robotic system. In various embodiments, component 122 may visually display one or more subsequent (i.e., next) steps of a task/activity, via interface 106, wherein a task may be a collaborative task.

More specifically, in various embodiments, if an end user and robotic system 140 are performing activities in a collaborative manner, then component 122, via computing device 110 (e.g., an AR or VR device), visually displays one or more subsequent steps of the robotic systems actions/movements associated with the collaborative task to the end user, wherein the visual display, generated on interface 106, enables the end user identify the subsequent movements and actions of robotic system 140 associated with a predetermined number of subsequent steps and how robotic system 140 will perform the subsequent steps. In various embodiments, the generated visual display of subsequent actions by robotic system 140 will be a translucent overlay of robotic system's 140 movements, wherein the translucent overlay of robotic system 140's movements comprise a sequential component (e.g., numerical and/or alphabetical sequences). In some embodiments, component 122 utilizes colors, shading, symbols, sounds, and/or vibrations to indicate a next movement and/or a current movement of robotic system 140.

Component 122 may virtually display, via computing device 110, one or more subsequent steps associated with a task and robotic system 140 movements associated with each subsequent step associated with a task. In various embodiments, while displaying subsequent steps of a task and robotic movements associated with each subsequent step associated with a task, component 122 virtually displays, via computing device 110, one or more collaborative actions and/or instructions for an end user to perform with robotic system 140. Component 122 may generate AR displays sequential steps for predicted sequencing of robotic system 140 movement (e.g., performed actions while performing a task). In various embodiment, component 122 virtually displays identified sequential steps of robotic system 140 task while performing a task, wherein each step of the virtually displayed sequential steps of robotic system 140 is visually distinguishable from each other (e.g., but not limited to, color, shape, icon, etc.), as described below in FIG. 2.

Component 122 generates one or more AR animated logical progression of the flow of robotic system 140. In various embodiments, component 122, via computing device 110 (e.g., one or more AR devices) generates and displays animated movement of robotic system 140. Component 122 via computing device 110 (e.g., one or more AR devices) generates and displays a VR or AR animation of the logical progression of robotic system 140 associated with one or more subsequent steps of a task. In some embodiments, component 122 identifies one or more positions within the logical progression of robotic system 140 to perform concurrent tasks with robotic system 140. Component 122 may recommend, via virtual reality display, actions for the end user to perform based on the identified or anticipated subsequent movement path of task steps of robotic system 140. In various embodiments, based on the identified or anticipated subsequent movement path of task steps of robotic system 140, component 122 visually displays, through AR, task/action recommendations for an end user to perform in tandem with robotic system 140, wherein the generated AR display visually guides the end user how to perform the recommended actions in the surrounding area.

In various embodiments, component 122 may display, via component 122, alerts and/or warnings when a mishap occurs during a task being performed by and end user or robotic system 140. For example, a displayed alert may be, but not limited to, a responsive prompt, a banner notification, display distortion, a predetermined audio notification, activating a predetermined animated icon, and/or a sudden change in color or shape or one or more aspects of the virtual display. In some embodiments, component 122 may utilize smart wearable IoT devices, sensors, and/or computing devices associated with an end user (e.g., smartwatch, smartphone, etc.) and/or robotic system 140 (e.g., pressure gauge, thermal sensors, and/or any other sensor and/or IoT device known in the art), wherein the smart wearable IoT devices, sensors, and/or computing devices associated with an end user or robotic system 140 comprises, but are not limited to, biometric sensors, sensors in a predetermine area that measure external environmental parameters, haptic (e.g., vibration or electrical stimulus) or audio alerts that are executed when a mishap is identified, and/or receive or issue voice commands or alerts. Component 122 may modify the sequence of robotic motions to avoid overlap with the sequence of human motions within the environment. In various embodiments, component 122 modifies a sequence of end user motions based on the sequence of robotic motions within the environment and a safety guide.

Figure 1B:
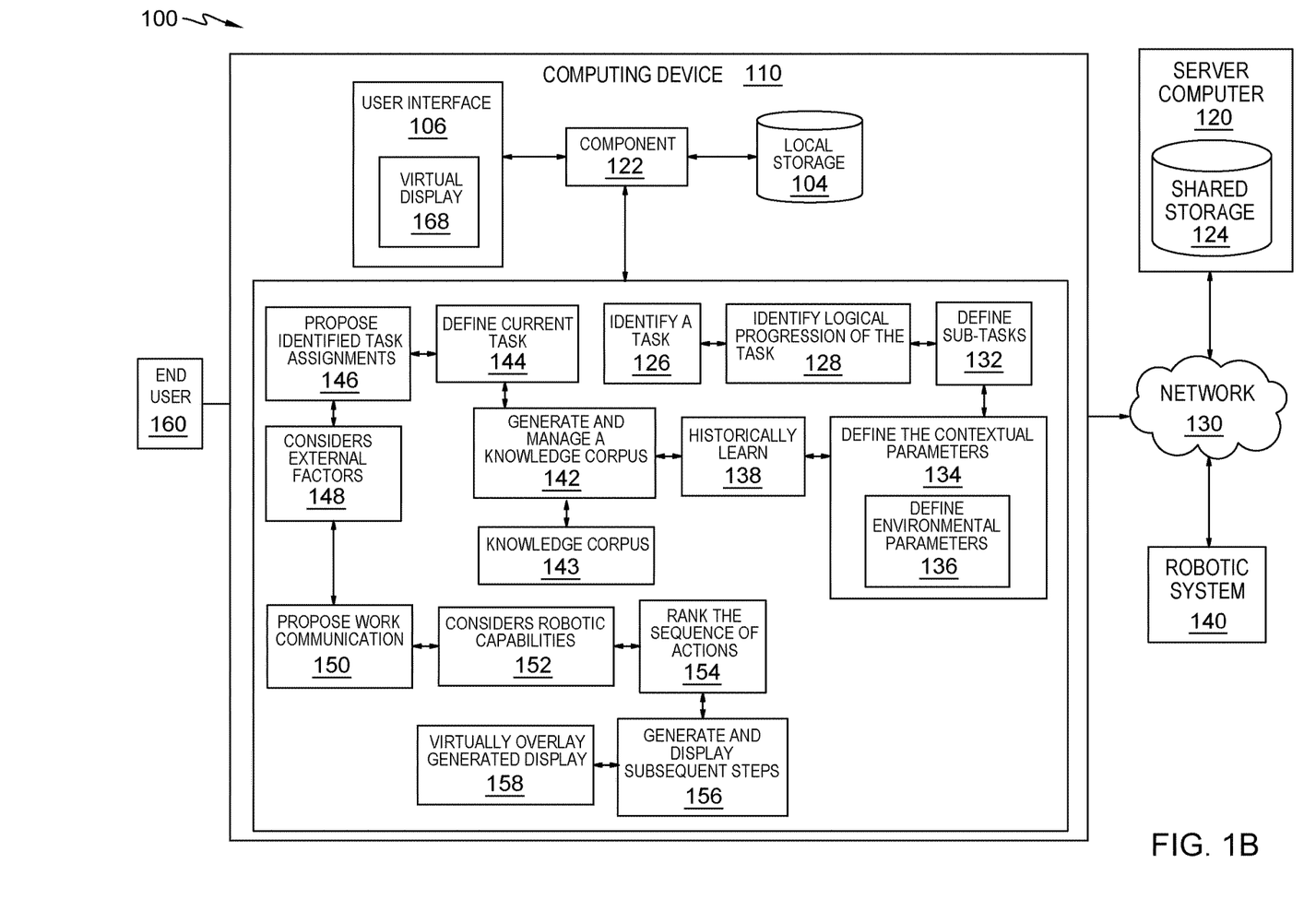
FIG. 1B is a functional block diagram illustrating a distributed data processing environment of a coordination component, in accordance with an embodiment of the present invention.

FIG. 1B is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1B provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes end user 160, robotic system 140, computing device 110, and server computer 120 interconnected over network 130.

In the depicted embodiment, component 122 identifies a task 126 being performed by end user 160 and/or robotic system 140, via IoT devices and/or sensors. In some embodiments, component 122 identifies task 126 is being performed by end user 160 and/or robotic system 140 based on a predetermined command to execute a task. Component 122 may retrieve historical information from shared storage 124 and/or local storage 104 to identify how identified task 126 is performed, wherein the historical information may comprise data detailing movements and actions of robotic system 140 and end user tasks, environmental conditions, predetermined end user skills, and/or robotic system 140 capabilities. In various embodiments, based on received instruction, component 122 identifies a task and divides the task into a plurality of steps using natural language processing. In some embodiments, component 122 identifies a task and divides the task into a plurality of steps based on received media files (e.g., video files) using image recognition to identify the movement and actions of end user 160 and/or robotic system 140. In the depicted embodiment, component 122 identifies logical progression of the task 128 based on the retrieved historical data and defining sub-tasks 132 (i.e., steps) of identified task 126 (i.e., task 126) based on the historical data, wherein the defined steps illustrate a step-by-step or movement-by-movement illustration of how identified task 126 is performed.

In the depicted embodiment, component 122 defines contextual parameters 134 based on historical learning and data or on preconfigured information. Component 122 may define contextual parameters 134 by considering various contextual environmental parameters, and how the contextual environmental parameter can influence the human and robotic worker collaboration. Component 122 may define environmental parameters 136 by identifying various contextual environmental parameters (e.g., physical to chemical characteristics that are known and understood in the art). Component 122 may historically learn 138 and identify how the environmental parameters can influence the collaboration between end user 160 and robotic system 140. Component 122 may generate and manage knowledge corpus 143 based on collected data from internet of things (IoT) devices, camera, and/or various sensors. The collected data may comprise: any conflict between end user 160 and robotic system 140 movement, time required to complete, accidental situation, time available to mitigate, how the alert is provided, assigned tasks, time required to complete assigned tasks, common errors in performed tasks, a completed task, etc.

In various embodiments, component 122 references knowledge corpus 143 to define a task, assign activities, identify the sequences of a task, and/or identify how end user 160 and robotic system 140 can perform collaborated tasks. In the depicted embodiment, component 122 defines a currently executing task and/or an assigned task (e.g., type/category of task, type of skill required to complete the task, etc.) based on one or more received commands and/or historical data in knowledge corpus 143. Additionally, component 122 may identify, via IoT devices, local storage 104, and/or shared storage 124, environmental parameters in a predetermined area where the task is being performed or is anticipated to be performed (e.g., assigned task). In various embodiments, based on the defined task and identified environmental parameters, component 122 assigns one or more tasks and/or sub-tasks 132 to end user 160 and/or robotic system 140.

In the depicted embodiment, component 122 considers external factors 148 by considering external influencing factors, assigned activities, predetermined capabilities of robotic system 140, and/or predetermined skills of end user 160, wherein the predetermined capabilities and predetermined skills are retrieved from a robotic system profile and an end user profile, respectively. External factor can be, but is not limited to, weather, ventilation, wind flow, temperature, humidity, amount of dust, and/or predetermined air particle concentration. Generally, external factors may be any factors known in the art that cause difficulty or increase the effectiveness at workplace. For example, because a machine assembly is performed in an open-air environment, component 122 measures the amount of dust and humidity in the environment. Component 122 may propose and/or display, via virtual display 168, on interface 106, work communication associated with task 126 (e.g., progress of the activity/task as per the sequence) by identifying subsequent task steps associated with task 126 and/or sub-tasks 132 assigned to end user 160 and/or robotic system 140. In the depicted embodiment, component 122 considers robotic capabilities 152 (i.e., capabilities of robotic system 140) by identifying the movement capabilities, mechanical abilities, and/or required movement of robotic system 140 to perform task 128 from retrieved historical data from knowledge corpus 143, predetermined data and/or a predetermined profile associated with robotic system 140 from local storage 104 and/or shared storage 124. Component 122 may rank the sequence of actions 124 associated with performing task 126, wherein the ranking lists the sequence actions from highest priority to lowest priority based on a predetermined weighted measurement. For example, first robotic arm needs to grip an object, and then the end user can remove the remove bolt.

In the depicted embodiment component 122 generates and displays subsequent steps 156 to end user 160, via virtual display 168, wherein virtual display 168 is an augmented reality (AR) interface. Component 122 may virtually overlay generated display 158 of the subsequent steps that end user 160 and robotic system 140 perform in collaboration to complete task 126 (e.g., purposed task assignments 146). In various embodiments, virtual overlay of the generated display 158 depicts how end user 160 will perform task 126 and how end user 160 and robotic system 140 will move/perform in the predetermined area based at least on defined contextual parameters 134 and defined environmental parameters 136. In the depicted embodiment, component 122 guides end user 160 on how to initiate or terminate task 128.

Figure 2:
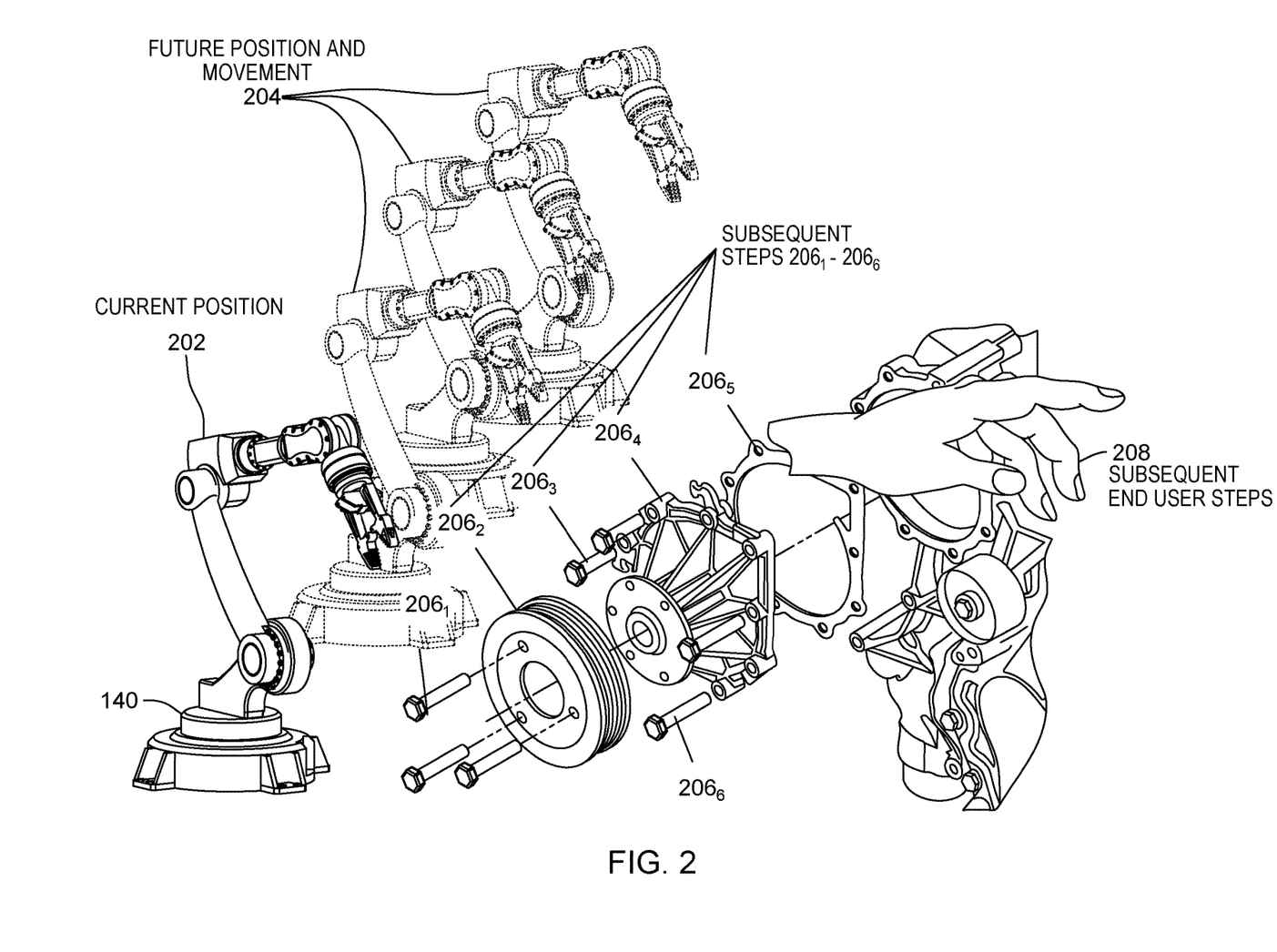
FIG. 2 is an exemplary embodiment of the coordination component.

FIG. 2 is an exemplary embodiment of the virtual display and guidance performed by component 122. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

In the depicted embodiment, FIG. 2 is oriented in the view of an end user viewing robotic system 140 and an assigned task through computing device 110 (e.g., an AR interface). In the depicted embodiment, robotic system 140 is in current position 202 preparing to perform at least a portion subsequent tasks associated with a primary task (i.e., subsequent steps $206_1$-$206_6$). In this embodiment, component 122 generates and displays, via interface 106, an AR representation of subsequent movements/steps associated with completing a primary task (e.g., future positions and movements of robotic system 140 associated with completing the primary task). Here, the subsequent movements/steps to be performed by robotic system 140 are represented by subsequent steps $206_1$-$206_6$. In various embodiments subsequent steps $206_1$-$206_6$ may be $206_1$-$206_N$ where N represents a positive integer, and accordingly the number of scenarios implemented in a given embodiment of the present invention is not limited to those depicted in FIG. 2.

Component 122 may virtually display, via computing device 110, an AR overlay of subsequent steps $206_1$-$206_6$ over an assigned task and an AR overlay of the future positions and movements 204 of robotic system 140. In various embodiments, while displaying subsequent steps of a task and robotic movements associated with each subsequent step associated with a task, component 122 virtually displays, via computing device 110, one or more collaborative actions and/or instructions for an end user to perform in collaboration with robotic system 140. In the depicted embodiment, component 122 displays, via computing device 110, an AR overlay of subsequent end user steps 208. Additionally, component 122 may generate AR displays sequential steps for predicted sequencing of robotic system 140 movement (e.g., performed actions while performing a task). In various embodiment, component 122 virtually displays identified sequential steps of robotic system 140 task while performing a task, wherein each step of the virtually displayed sequential steps of robotic system 140 is visually distinguishable from each other. In various embodiment, component 122 utilizes one or more different visual cues to visually distinguish between sequential steps associated with robotic system 140 and end user 160.

Component 122 generates one or more AR animated logical progression of the flow of robotic system 140 (e.g., future positions and movements 204 of robotic system 140 and subsequent steps $206_1$-$206_6$). In various embodiments, component 122, via computing device 110 (e.g., one or more AR devices) generates and displays animated movement of robotic system 140. Component 122 via computing device 110 (e.g., one or more AR devices) generates and displays a VR or AR animation of the logical progression of robotic system 140 associated with one or more subsequent steps of a task. In some embodiments, component 122 identifies one or more positions within the logical progression of robotic system 140 to perform concurrent tasks with robotic system 140. Component 122 may recommend, via virtual reality display, actions for the end user to perform based on the identified or anticipated subsequent movement path of task steps of robotic system 140.

Figure 3:
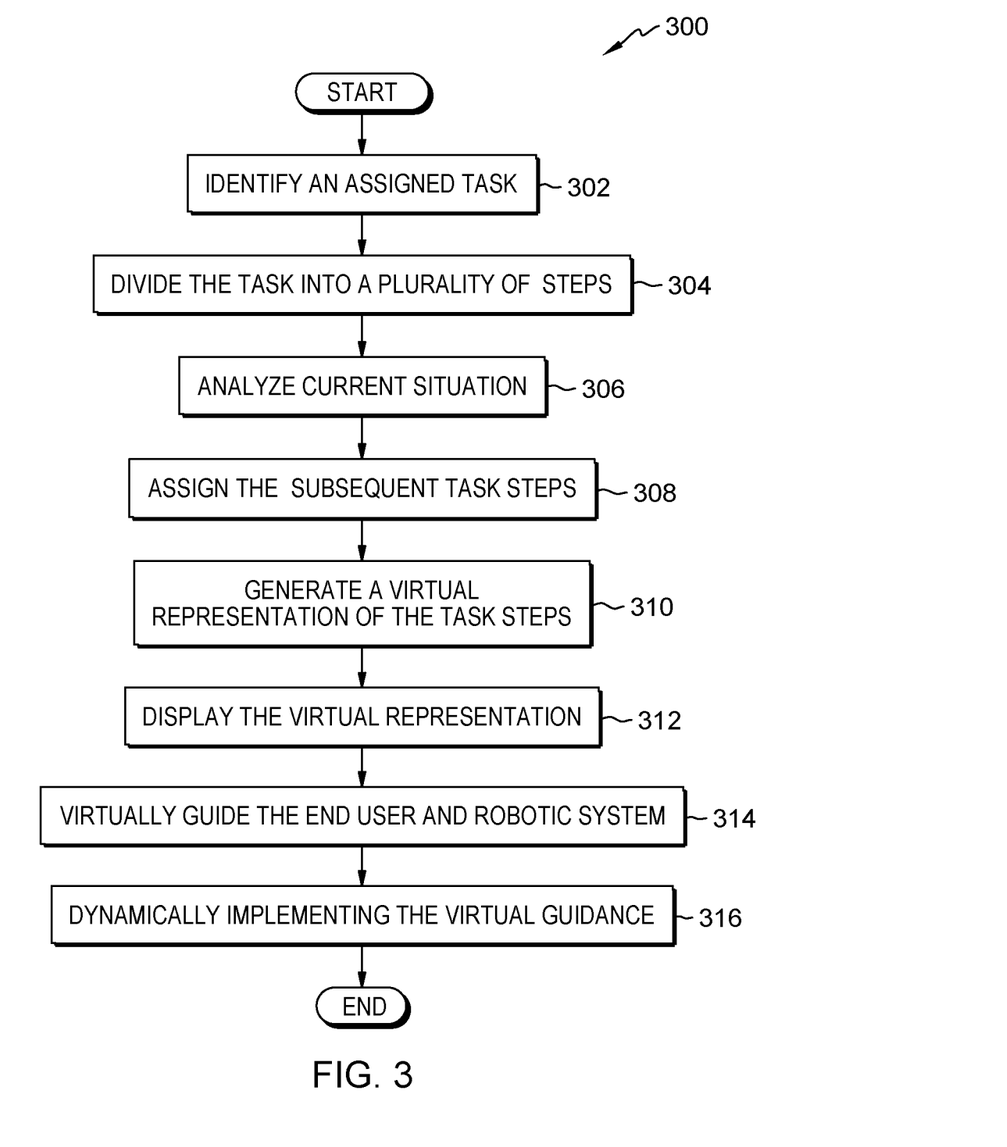
FIG. 3 illustrates operational steps of the coordination component, on a server computer within the distributed data processing environment of FIGS. 1A-1B, for coordinating task performance, in accordance with an embodiment of the present invention.

FIG. 3 illustrates operational steps of component 122, generally designated 200, in communication with server computer 120, within distributed data processing environment 100 of FIG. 1A and/or FIG. 1B, for coordinating task performance, in accordance with an embodiment of the present invention. FIG. 3 provides an illustration of one implementation and does not imply any limitations with regard to the environments in which different embodiments may be implemented. Many modifications to the depicted environment may be made by those skilled in the art without departing from the scope of the invention as recited by the claims.

In step 302, component 122 identifies an assigned task. In various embodiments, component 122 identifies one or more activities currently being performed by end user and/or robotic system and/or that are assigned to an end user or robotic system.

In step 304, component 122 divides the task identified assigned task into a plurality of subsequent steps. In various embodiments, component 122 may device the identified assigned task into a plurality of subsequent steps, wherein the plurality of subsequent steps comprises anticipated and/or predetermined movements, positions, and/or actions performed by an end user and/or robotic system either individual or in collaboration.

In step 306, component 122 analyzes the current situation. In various embodiments, component 122 analyzes the current situation involving the assigned task, an end user, and a robotic system, via IoT devices (e.g., devices that detect and/or measure one or more physical properties and then records or otherwise responds to that property, such as vibration, chemicals, radio frequencies, environment, weather, humidity, light, etc.).

In step 308, component 122 assigns the task subsequent task steps. In various embodiments, component 122 assigns one or more of the plurality of subsequent steps to one or more end users' workers and/or one or more robotic workers based on one or more predetermined skills of the one or more end users, one or more capabilities of the one or more robotic system, and one or more environmental factors of an environment.

In step 310, component 122 generates a virtual representation of the subsequent task steps. In various embodiments, component 122 generates a virtual representation of the assigned subsequent task steps, wherein the virtual representation is an AR overlay of the assigned subsequent steps that depicts predicted or predetermined movement of the robotic system and/or the end user to complete the identified task.

In step 312, component 122 displays the generated virtual representation of the subsequent steps. In various embodiments, component 122 displays, via interface 106, generated virtual representation of the subsequent steps to the end user, wherein the displayed virtual representation of the subsequent steps are interactive and responsive to movement and completed subsequent steps by the end user and/or robotic system. In some embodiments, the displayed virtual representation may interact with paired haptic and/or other IoT devices to issue alerts, notification, and/or guidance. In various embodiments, component 122 display a predetermined number of subsequent steps, wherein the predetermined amount of displayed subsequent steps are dynamically adjusted.

In step 314, component 122 virtually guides the end user and the robotic system. In various embodiments, component 122 virtually guides the end user and/or the robotic system through visual display (e.g., suggestive clues like arrows, colors, and/or explicit audio and/or text instructions) and/or IoT devices (e.g., haptic sensors that distribute vibration, alarms and/or notifications displayed on one or more computing devices, light distribution, and focus, etc.).

In step 316, component 122 dynamically implements the virtual guidance. In various embodiments, component 122 dynamically adjusts the guidance based on performance. For example, if a displayed subsequent task has been completed then component 122 terminates the display of the executed task and displays one or more different assigned subsequent tasks. For example, if component 122 is virtually displaying and guiding subsequent steps 1-6 and the end user and/or robotic system complete subsequent step 1 then component 122 will terminate the display and guidance for step 1 and move virtual display and guidance to subsequent step 2, virtually generated an overlay for subsequent step 7 and virtually display subsequent steps 2-7.

Figure 4:
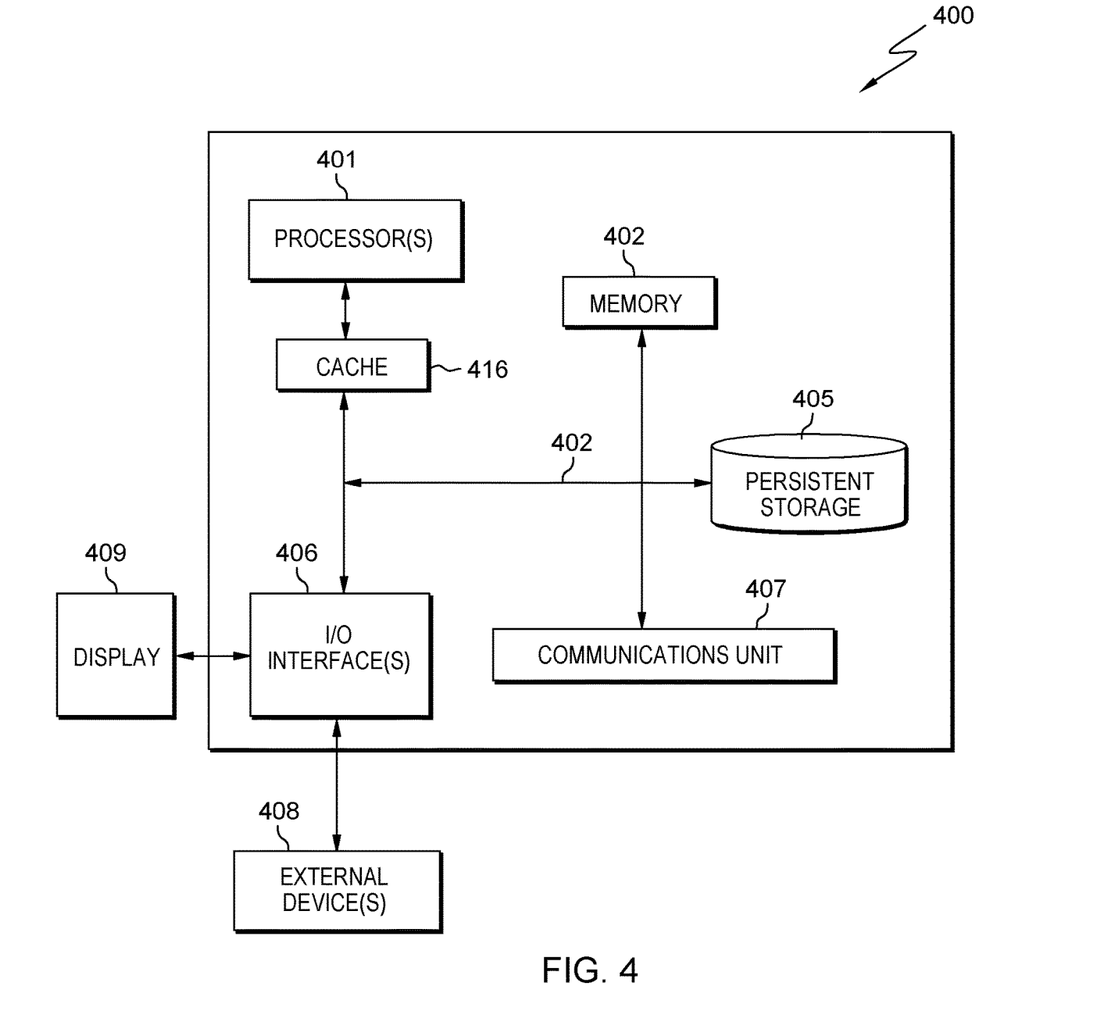
FIG. 4 depicts a block diagram of components of the server computer executing the coordination component within the distributed data processing environment of FIGS. 1A-1B, in accordance with an embodiment of the present invention.

FIG. 4 depicts computer system 400, where server computing 120 represents an example of computer system 400 that includes component 122. The computer system includes processors 401, cache 403, memory 402, persistent storage 405, communications unit 407, input/output (I/O) interface(s) 406, display 409, external device(s) 408 and communications fabric 404. Communications fabric 404 provides communications between cache 403, memory 402, persistent storage 405, communications unit 407, and input/output (I/O) interface(s) 406. Communications fabric 404 may be implemented with any architecture designed for passing data and/or control information between processors (such as microprocessors, communications, and network processors, etc.), system memory, peripheral devices, and any other hardware components within a system. For example, communications fabric 404 may be implemented with one or more buses or a crossbar switch.

Memory 402 and persistent storage 405 are computer readable storage media. In this embodiment, memory 402 includes random access memory (RAM). In general, memory 402 may include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 enables for input and output of data with other devices that may be connected to each computer system. For example, I/O interface 406 may provide a connection to external devices 408 such as a keyboard, keypad, a touch screen, and/or some other suitable input device. External devices 408 may also include portable computer readable storage media such as, for example, thumb drives, portable optical or magnetic disks, and memory cards. Software and data used to practice embodiments of the present invention may be stored on such portable computer readable storage media and may be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for coordinating performance of a task, the computer-implemented method comprising:
    dividing, by a computing device, the task into a plurality of steps;
    analyzing a context and other external factors of an environment and task, wherein external factors comprise weather, ventilation, amount of dust, and predetermined air particle concentration;
    assigning the plurality of steps to one or more end users and one or more robotic systems based on, the analyzed context, the external factors, and one or more predetermined skills of the one or more end users;
    identifying a sequence of predetermined and anticipated motions that will be performed by the one or more robotic systems to carry out the plurality of steps;
    outputting a virtual display, by an augmented reality device associated with the one or more end users, the identified predetermined and anticipated motions of the one or more robotic systems;
    identifying one or more positions within a logical progression of the one or more robotic systems to enable the one or more end users to perform a concurrent task with robotic system;
    communicating guidance, based on the virtual display, to the augmented reality device associated with the one or more end users to guide the one or more end users through the concurrent task; and
    dynamically adjusting a sequence of the one or more end user motions associated with the guidance based on the sequence of robotic motions within a current environment based on an identified performance of the one or more end users or the one or more robotic systems.

2. The computer-implemented method of claim 1, further comprising:
    modifying the sequence of robotic motions to avoid overlap with a sequence of end user tasks within a predetermined environment.

3. The computer-implemented method of claim 1, further comprising:
    modifying a sequence of end user task based on the identified sequence of robotic motions within a predetermined environment and a safety guide.

4. The computer-implemented method of claim 1, further comprising:
    modifying the sequence of robotic motions based on the sequence of end user motions within a predetermined environment and a safety guide.

5. The computer-implemented method of claim 1, further comprising:
    dynamically monitoring, by one or more sensors, a plurality of environmental factors of a predetermined environment.

6. The computer-implemented method of claim 1, further comprising:
    implementing the task, wherein the task is assigned or predetermined; and
    retrieving, from a storage device, one or more previously stored robotic motions associated with the assigned task.

7. The computer-implemented method of claim 1, wherein the assigning, of the plurality of steps to the one or more end users and the one or more robotic systems, is based on one or more skills of the one or more end users, one or more capabilities of the one or more robotic systems, and one or more environmental factors.

8. A computer system for coordinating performance of a task, the computer system comprising:
    one or more computer processors;
    one or more computer readable storage devices; and
    program instructions stored on the one or more computer readable storage devices for execution by at least one of the one or more computer processors, the stored program instructions comprising:
        program instructions to divide, by a computing device, the task into a plurality of steps;
        program instructions to analyze a context and other external factors of an environment and task, wherein external factors comprise weather, ventilation, amount of dust, and predetermined air particle concentration;
        program instructions to assign the plurality of steps to one or more end users and one or more robotic systems based, the analyzed context, the external factors, and on one or more predetermined skills of the one or more end users;
        program instructions to identify a sequence of predetermined and anticipated motions that will be performed by the one or more robotic systems to carry out the plurality of steps;
        program instructions to output a virtual display, by an augmented reality device associated with the one or more end users, the identified predetermined and anticipated motions of the one or more robotic systems;
        program instructions to identify one or more positions within a logical progression of the one or more robotic systems to enable the one or more end users to perform a concurrent task with robotic system;
        program instructions to communicate guidance, based on the virtual display, to the augmented reality device associated with the one or more end users to guide the one or more end users through the concurrent task; and
        program instructions to dynamically adjust a sequence of the one or more end user motions associated with the guidance based on the sequence of robotic motions within a current environment based on an identified performance of the one or more end users or the one or more robotic systems.

9. The computer system of claim 8, further comprising:
    program instructions to modify the sequence of robotic motions to avoid overlap with a sequence of end user tasks within a predetermined environment.

10. The computer system of claim 8, further comprising:
program instructions to modify a sequence of end user task based on the identified sequence of robotic motions within a predetermined environment and a safety guide.

11. The computer system of claim 8, further comprising:
program instructions to modify the sequence of robotic motions based on the sequence of end user motions within a predetermined environment and a safety guide.

12. The computer system of claim 8, further comprising:
program instructions to dynamically monitor, by one or more sensors, a plurality of environmental factors of a predetermined environment.

13. The computer system of claim 8, further comprising:
program instructions to implement the task, wherein the task is assigned or predetermined; and
program instructions to retrieve, from a storage device, one or more previously stored robotic motions associated with the assigned task.

14. The computer system of claim 8, wherein the assigning, of the plurality of steps to the one or more end users and the one or more robotic systems, is based on one or more skills of the one or more end users, one or more capabilities of the one or more robotic systems, and one or more environmental factors.

15. A computer program product for coordinating performance of a task, the computer program product comprising:
one or more non-transitory computer readable storage media and program instructions stored on the one or more non-transitory computer readable storage media, the stored program instructions comprising:
program instructions to divide, by a computing device, the task into a plurality of steps;
program instructions to analyze a context and other external factors of an environment and task, wherein external factors comprise of at least one of weather, ventilation, amount of dust, and predetermined air particle concentration;
program instructions to assign the plurality of steps to one or more end users and one or more robotic systems based, the analyzed context, the external factors, and on one or more predetermined skills of the one or more end users;
program instructions to identify a sequence of predetermined and anticipated motions that will be performed by the one or more robotic systems to carry out the plurality of steps;
program instructions to output a virtual display, by an augmented reality device associated with the one or more end users, the identified predetermined and anticipated motions of the one or more robotic systems;
program instructions to identify one or more positions within a logical progression of the one or more robotic systems to enable the one or more end users to perform a concurrent task with robotic system;
program instructions to communicate guidance, based on the virtual display, to the augmented reality device associated with the one or more end users to guide the one or more end users through the concurrent task; and
program instructions to dynamically adjust a sequence of the one or more end user motions associated with the guidance based on the sequence of robotic motions within a current environment based on an identified performance of the one or more end users or the one or more robotic systems.

16. The computer program product of claim 15, further comprising:
program instructions to modify the sequence of robotic motions to avoid overlap with a sequence of end user tasks within a predetermined environment; and
program instructions to modify a sequence of end user task based on the identified sequence of robotic motions within the predetermined environment and a safety guide.

17. The computer program product of claim 15, further comprising:
program instructions to modify the sequence of robotic motions based on the sequence of end user motions within a predetermined environment and a safety guide.

18. The computer program product of claim 15, further comprising:
program instructions to dynamically monitor, by one or more sensors, a plurality of environmental factors of a predetermined environment.

19. The computer program product of claim 15, further comprising:
program instructions to implement the task, wherein the task is assigned or predetermined; and
program instructions to retrieve, from a storage device, one or more previously stored robotic motions associated with the assigned task.

20. The computer program product of claim 15, wherein the assigning, of the plurality of steps to the one or more end users and the one or more robotic systems, is based on one or more skills of the one or more end users, one or more capabilities of the one or more robotic systems, and one or more environmental factors.

* * * * *